(12) United States Patent
Takeshita

(10) Patent No.: US 6,754,010 B2
(45) Date of Patent: Jun. 22, 2004

(54) IMAGE TAKING APPARATUS, CONTROL METHOD THEREFOR, AND CONTROL PROGRAM

(75) Inventor: Shigeru Takeshita, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/283,294

(22) Filed: Oct. 30, 2002

(65) Prior Publication Data
US 2003/0081324 A1 May 1, 2003

(30) Foreign Application Priority Data
Nov. 1, 2001 (JP) ........................................ 2001-336511

(51) Int. Cl.$^7$ .................. G02B 15/14; G03B 17/00; H04N 5/225
(52) U.S. Cl. .................. 359/697; 359/698; 396/85; 348/220.1; 348/240.3
(58) Field of Search ................... 359/694, 696, 359/697, 698, 670; 348/220.1, 240.3, 240.9; 396/72, 85, 87

(56) References Cited

U.S. PATENT DOCUMENTS 5,134,525 A * 7/1992 Kaneda ........................ 359/697
6,618,559 B1 * 9/2003 Hofer ........................... 396/87

* cited by examiner

Primary Examiner—Scott J. Sugarman
Assistant Examiner—M. Hasan
(74) Attorney, Agent, or Firm—Fitzpatrick, Cella, Harper & Scinto

(57) ABSTRACT

An image taking apparatus performs drive control to allow a zoom lens for magnifying an object image to stop at a stop position from both a telephoto direction and a wide-angle direction when a first mode and a second mode can be selected, and the first mode is selected, and performs drive control to allow the zoom lens to stop at the stop position from only one of the telephoto direction and the wide-angle direction when the second mode is selected.

13 Claims, 16 Drawing Sheets

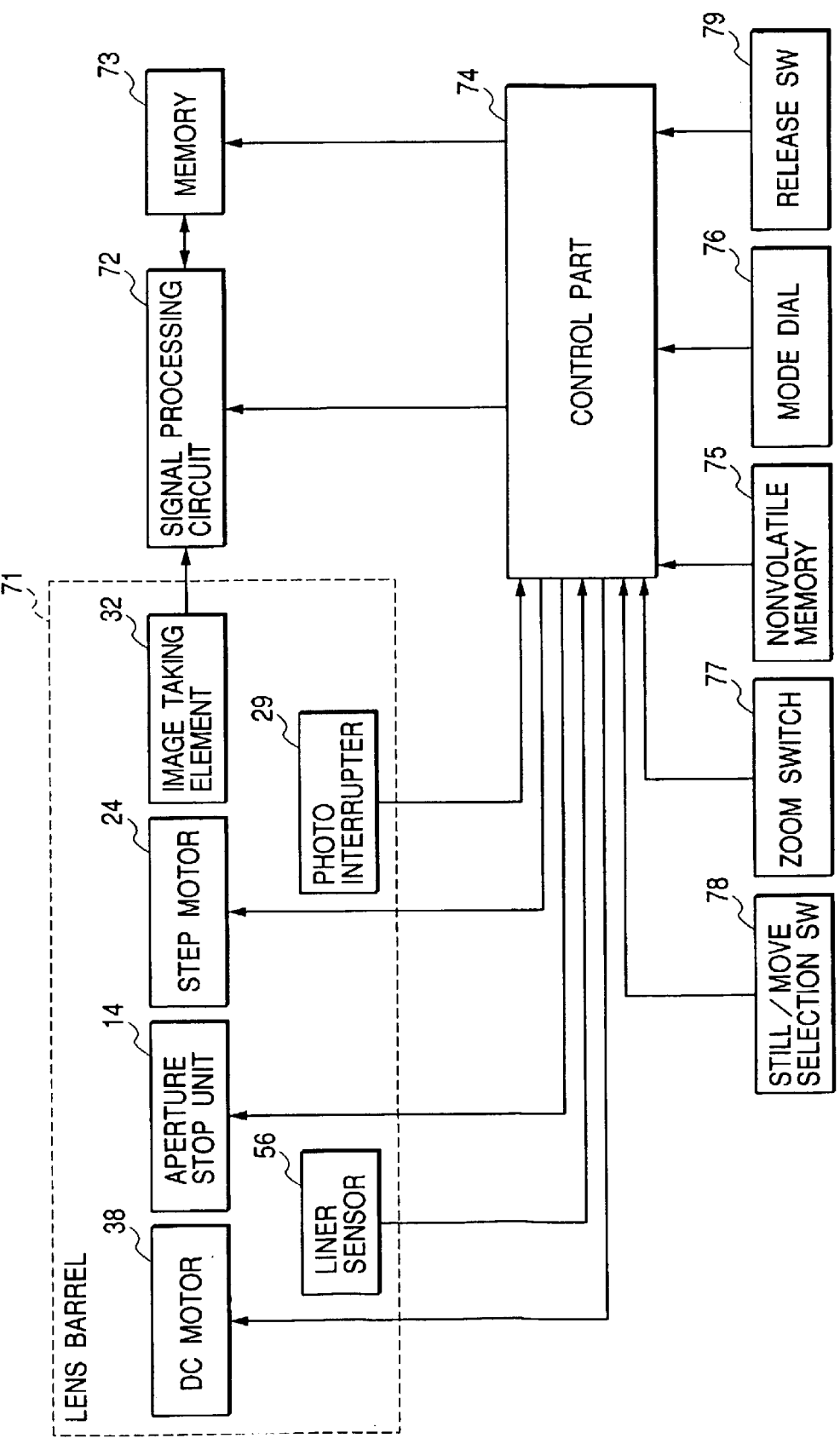

IMAGE TAKING APPARATUS, CONTROL METHOD THEREFOR, AND CONTROL PROGRAM

BACKGROUND OF THE INVENTION

1. Field of the Invention

The present invention relates to an image taking apparatus having a magnifying function of varying a magnification ratio for an object image by a zoom lens or the like, a control method for the apparatus, and a control program for the apparatus.

2. Related Background Art

Conventionally, electronic cameras which have an image taking element such as a CCD and a zoom function of performing a magnifying operation by moving a plurality of lens units in the optical axis direction have been widely known. These cameras are roughly classified into two types: cameras which are mainly used for still image taking and cameras which are mainly used for moving image taking. The former cameras, in particular, are required to perform the above magnifying operation at a high speed at the time of startup or determination of a view angle so as not to miss the shutter chance. In addition, in general, still images are more noticeable in frame distortion and blur than moving images, and hence are required to have high image quality. This makes it necessary to position lens units with high precision.

Conventionally, in order to satisfy such requirements for still images, a driving actuator such as a DC motor and a deceleration mechanism are used for a magnifying mechanism. A high-speed driving operation is performed by driving the above motor at a high rotational speed, and positioning control is performed to stop the lens units always from one direction, thereby positioning the lens units with high precision without being affected by the backlash of the deceleration mechanism.

In the conventional camera having the above function/control, if magnifying operation is done during moving image taking, the view angle changes too quickly or shifting operation at the time of positioning becomes awkward.

SUMMARY OF THE INVENTION

According to one aspect of the invention, an image taking apparatus performs drive control to allow a zoom lens for magnifying an object image to stop at a stop position from both a telephoto side and a wide-angle side when a first mode is selected, and performs drive control to allow the zoom lens to stop at the stop position from only one of the telephoto side and the wide-angle side when the second mode is selected, thereby eliminating awkward variations in view angle.

Other aspects of the present invention will be obvious from the preferred embodiment described in detail below in conjunction with the accompanying drawings.

DETAILED DESCRIPTION OF THE PREFERRED EMBODIMENT

A preferred embodiment of the present invention will be described in detail below with reference to the accompanying drawings.

Figure 1:
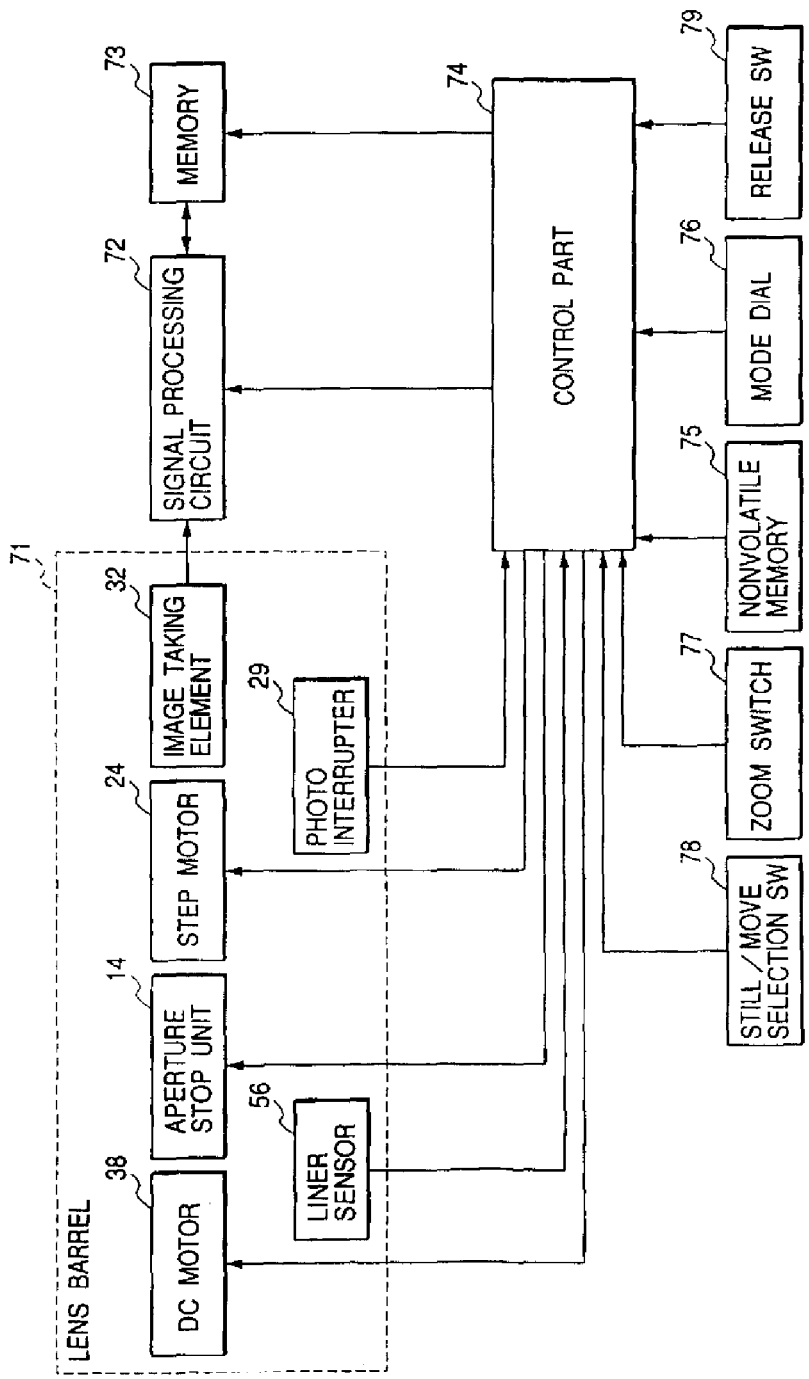
FIG. 1 is a block diagram showing the electrical arrangement of a camera according to an embodiment of the present invention.

FIG. 1 is a block diagram showing the electrical arrangement of a camera according to an embodiment of the present invention.

The image signal photoelectrically converted by an image taking element 32 is subjected to predetermined processing such as color conversion and gamma processing in a signal processing circuit 72. The resultant data is recorded on a memory 73 such as a card medium. A control part 74 controls the overall camera. The control part 74 controls a step motor 24, DC motor 38, and aperture stop unit 14 while monitoring outputs from a linear sensor 56, photo interrupter 29, and the like in the lens barrel, and also controls the signal processing circuit 72 and memory 73.

As a nonvolatile memory 75 capable of electrically erasing and recording data, for example, an EEPROM is used. An operator can switch and set various function modes such as a power OFF mode, image taking mode, playback mode, and PC connection mode by using a mode dial 76. The operator uses a zoom switch 77 to switch between movement to the wide-angle and movement to the telephoto mode.

A selection SW 78 is used to select the moving image taking mode or still image taking mode. This switch may be included in the mode dial 76. A release SW 79 is used to generate an instruction to start image taking (end image taking in the moving image taking mode).

Figure 2:
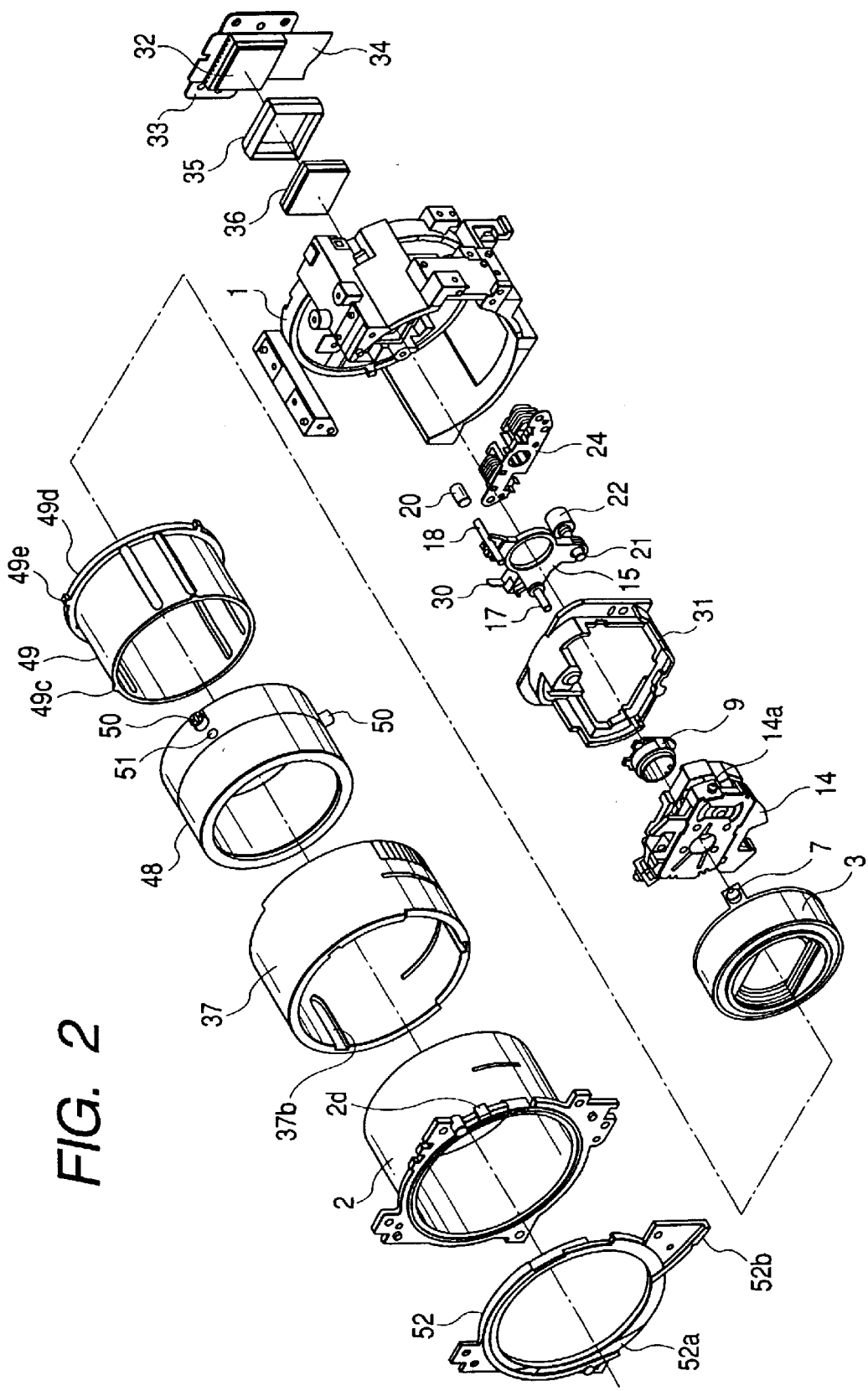
FIG. 2 is an exploded perspective view of the lens barrel portion of the camera in FIG. 1.
Figure 3:
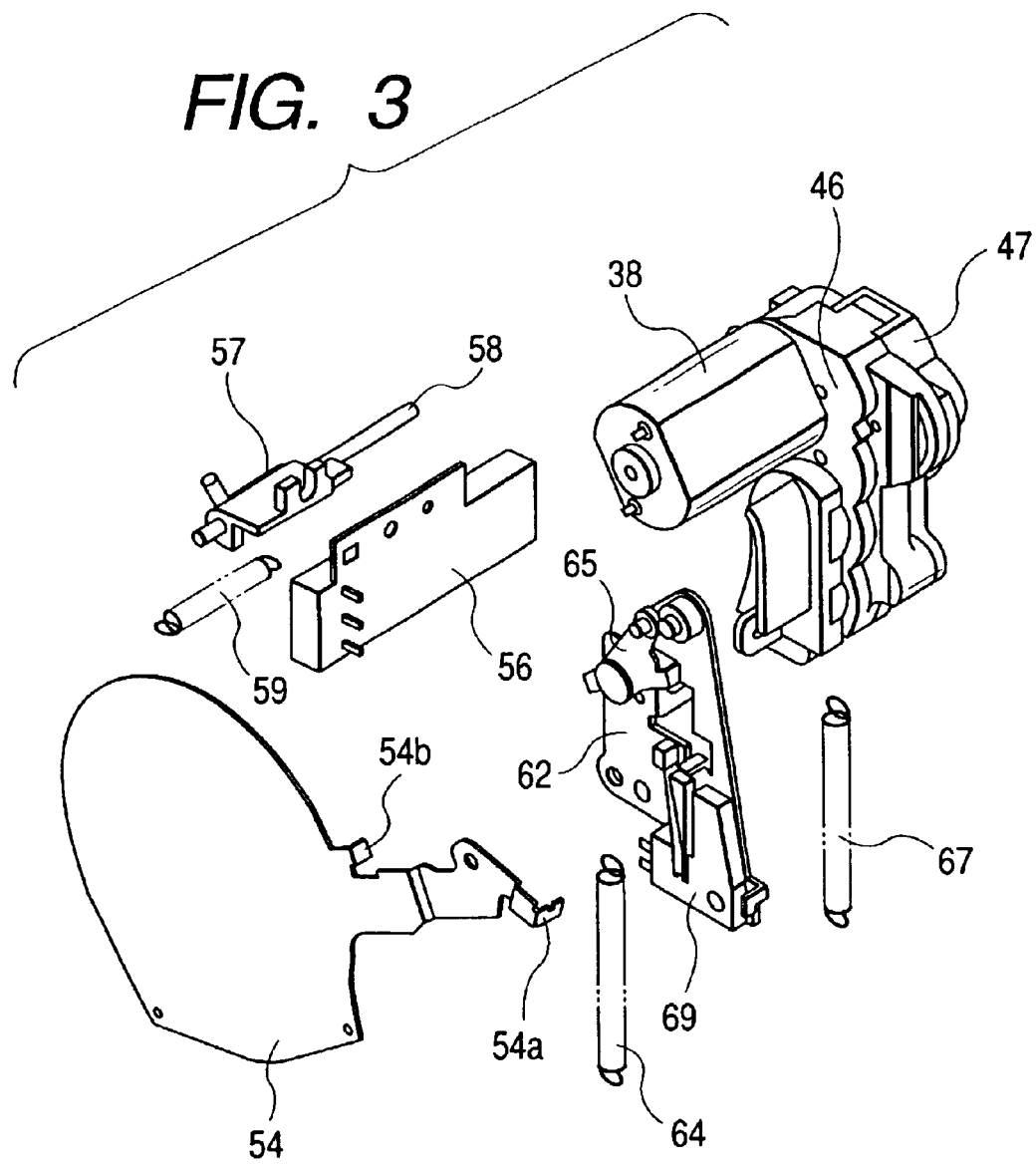
FIG. 3 is an exploded perspective view of the lens barrel portion of the camera in FIG. 1.
Figure 4:
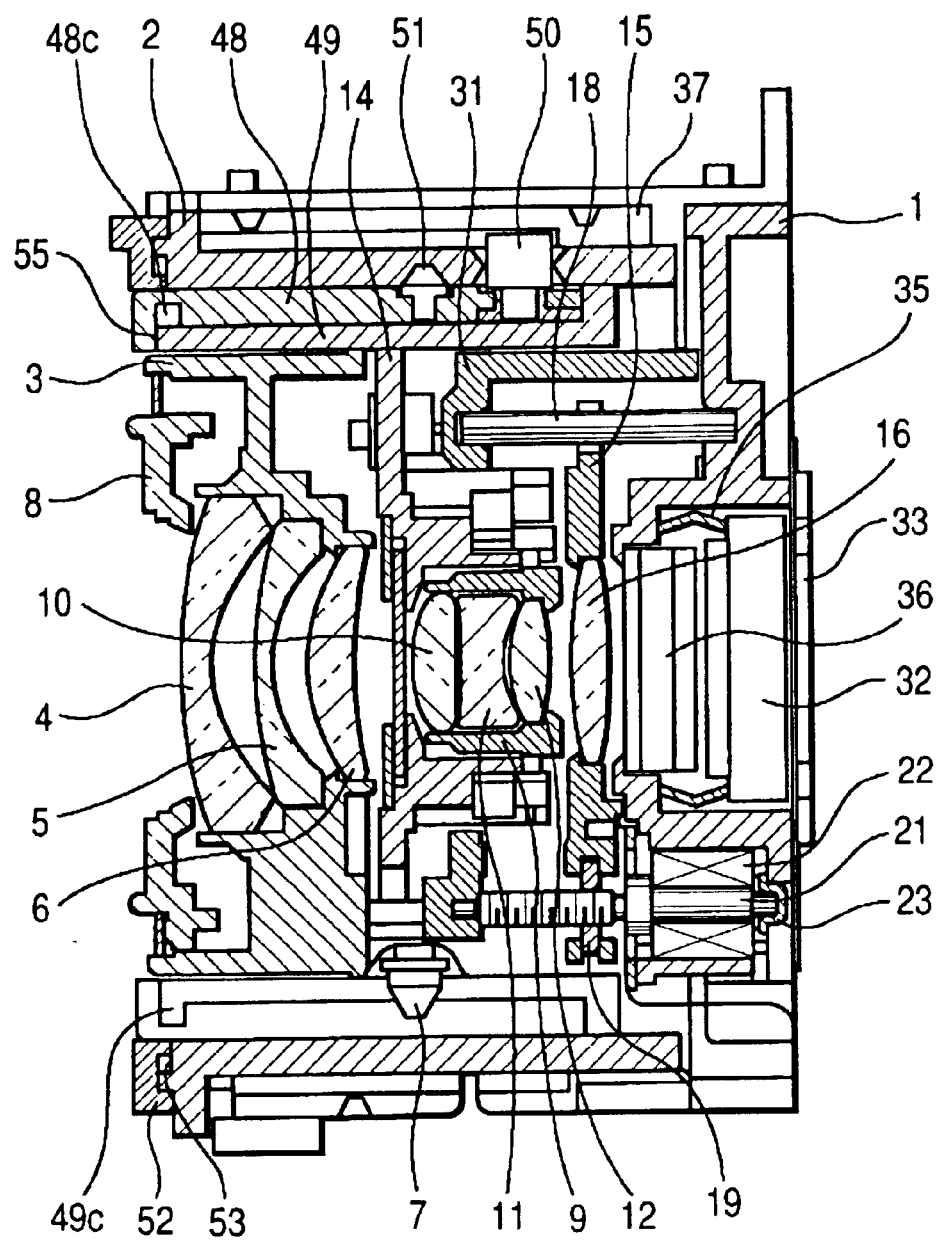
FIG. 4 is a sectional view of the central portion of the lens barrel (retracted position)
Figure 5:
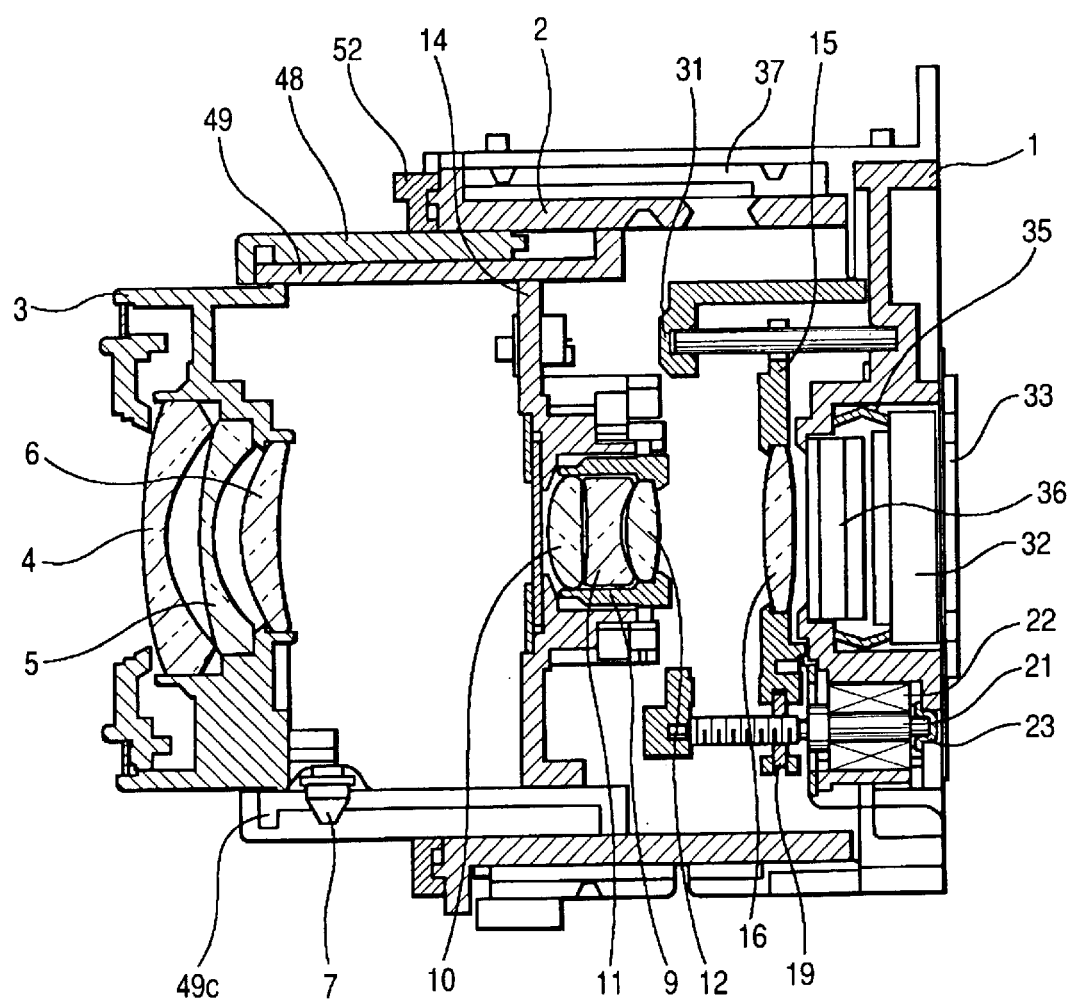
FIG. 5 is a sectional view of the central portion of the lens barrel (wide-angle position)
Figure 6:
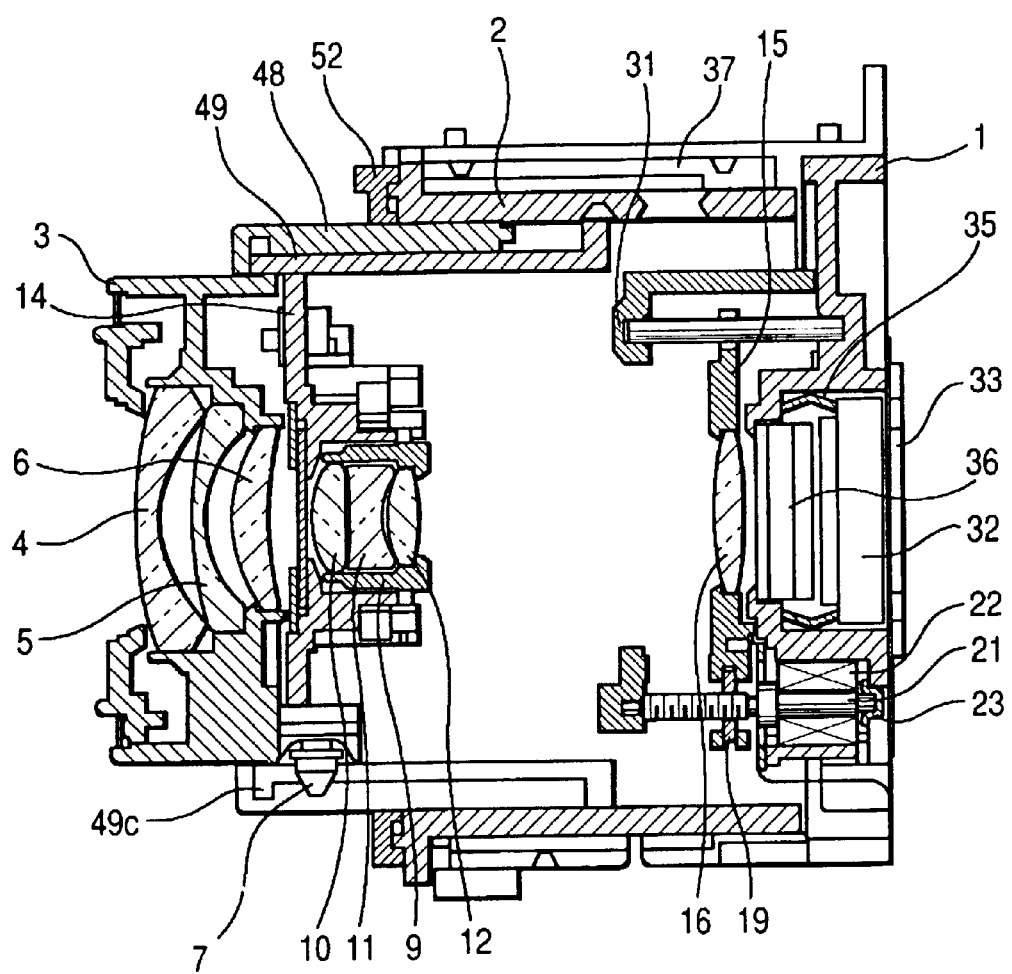
FIG. 6 is a sectional view of the central portion of the lens barrel (telephoto position)

FIGS. 2 and 3 are exploded perspective views of the lens barrel portion of the camera shown in FIG. 1. FIGS. 4 to 6 are sectional views of the central portion of the camera. FIG. 4 shows the retracted position. FIG. 5 shows the wide-angle position. FIG. 6 shows the telephoto position.

A base 1 in FIG. 2 is the base portion of the lens barrel unit, and forms the structure of the lens barrel unit, together with a fixed barrel 2 fixed to the front end portion of the base with screws. A first lens unit barrel 3 holds lenses 4, 5 and 6. Three follower pins 7 having tapered distal end portions are press-fitted in the outer circumferential side surface, and a cap 8 is fixed to the front surface of the first lens unit barrel 3 with an adhesive.

A second lens unit barrel 9 holds lenses 10, 11 and 12, and is integrally held on an aperture stop unit 14 with an adhesive or the like.

Three follower portions 14a having tapered distal end portions are integrally formed on the outer circumferential portion of the aperture stop unit 14.

Figure 7:
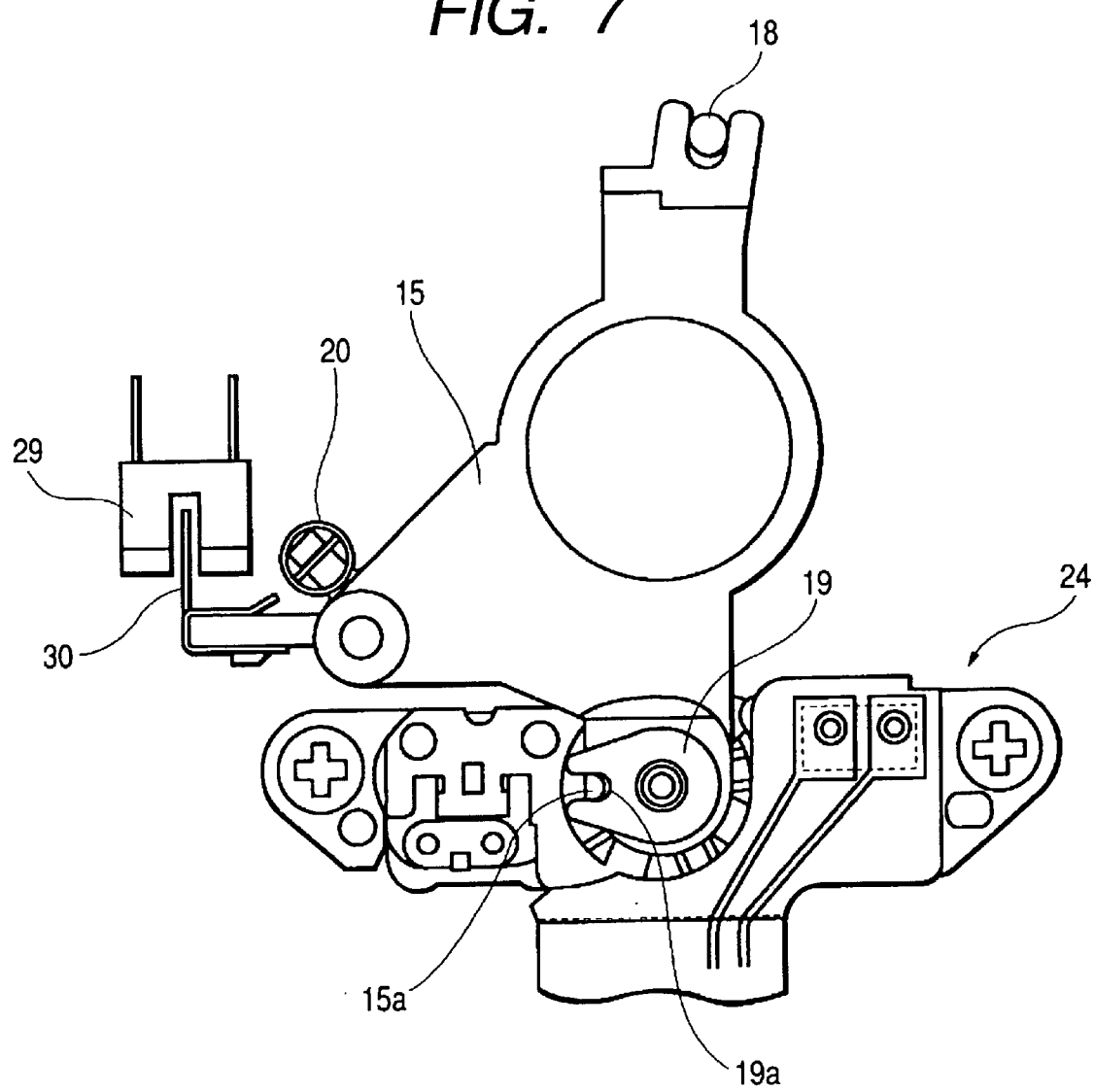
FIG. 7 is a front view of a third lens unit barrel portion.

A third lens unit barrel 15 holds a lens 16, and is guided by guide bars 17 and 18. The position of the third lens unit barrel 15 in the axial direction is regulated by a nut 19 having a female thread which is clamped in the arm portion of the barrel. The third lens unit barrel 15 is shifted in the retracting direction by a tension spring 20. A projection 15a of the third lens unit barrel 15 is fitted in a slit portion 19a formed in the nut 19 to restrict the rotation of the barrel (see FIG. 7).

A screw 21 is integrally mounted with a magnet 22, and has a male thread portion that threadably engages with the female thread portion of the nut 19. One end portion of the screw 21 is rotatably fitted in a metal bearing 23 press-fitted in the base 1. A step motor 24 serves to drive the third lens unit barrel 15 and is fixed to the base.

A photo interrupter 29 is fixed to the base 1. A slit plate 30 integrally fixed to the third lens unit barrel 15 is placed at a position where it can retractably extend into the slit portion of the photo interrupter 29. A cap 31 is fixed to the base 1. The cap 31 fixes the distal end sides of the guide bars 17 and 18 and rotatably holds the screw 21.

The image taking element 32 is fixed to a holding plate 33, which is fixed to the base 1 with screws, with an adhesive or the like. A flexible cable 34 supplies a photoelectrically converted image signal to a signal processing circuit (to be described later). Both a dustproof rubber 35 and an LPF 36 are fixed to the base 1 with an adhesive or the like.

Figure 8:
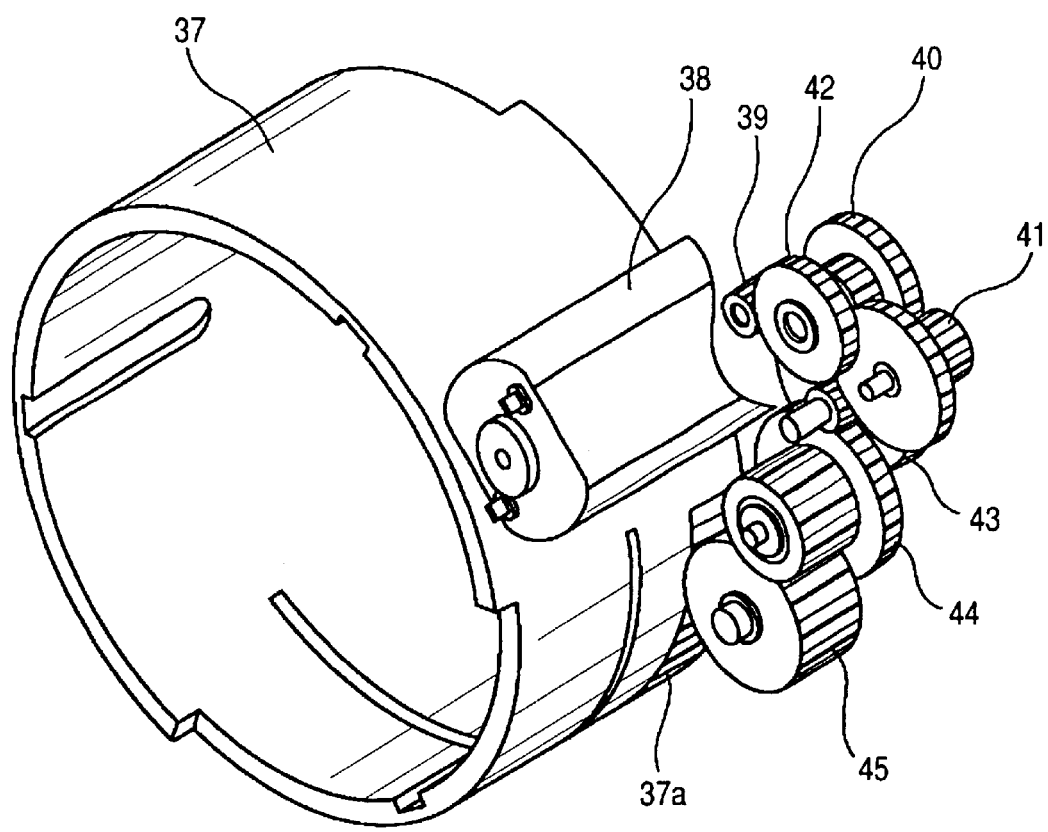
FIG. 8 is a perspective view of a zoom driving gear train.

A driving ring 37 is rotatably fitted on the outer circumferential portion of the fixed barrel 2. A gear portion 37a is formed on part of the outer circumferential portion of the driving ring 37. A pinion gear 39 is integrally mounted on the output shaft of a DC motor 38 by press fitting or the like. The driving force generated by the DC motor 38 is sequentially transferred from the pinion gear 39 to the gear portion 37a of the driving ring 37 via gears 40, 41, 42, 43, 44 and 45 (see FIG. 8). These gears 40 to 45 are housed in gear boxes 46 and 47 and fixed to the base 1. The DC motor 38 is also fixed to the gear box 46.

Figure 9:
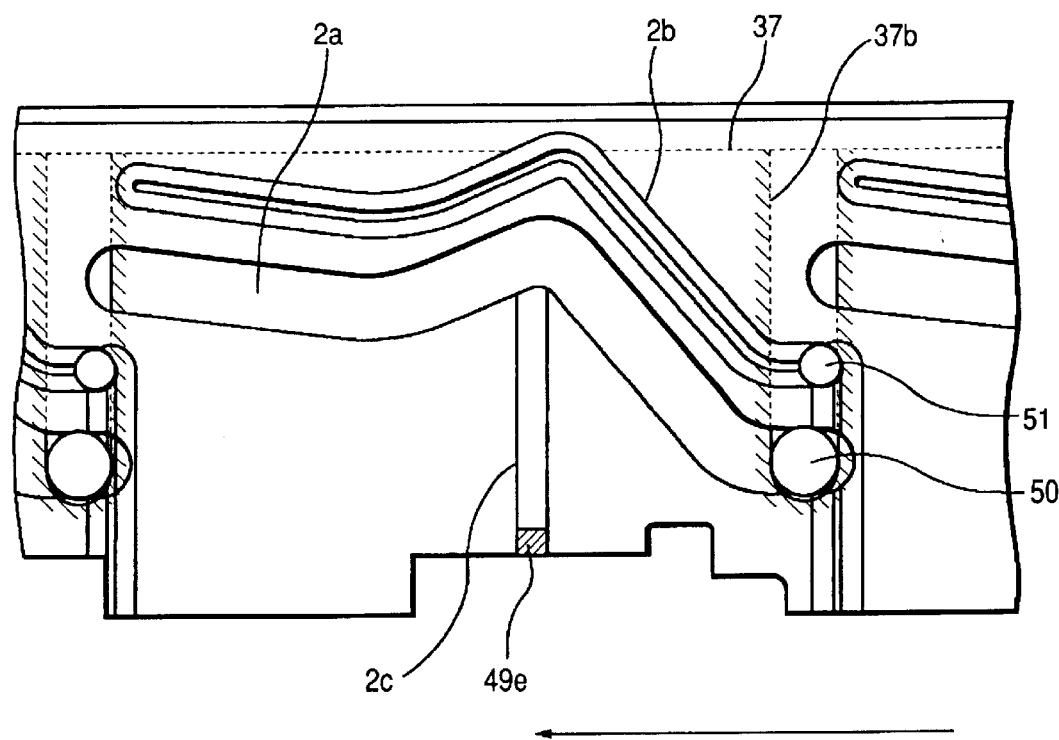
FIG. 9 is a development of the inner surface of a fixed barrel.

A moving cam ring 48 is fitted in the inner circumferential portion of the fixed barrel 2. A rectilinear guide barrel 49 is fitted in the inner circumferential side of the moving cam ring. Driving pins 50 and follower pins 51 having tapered portions extend vertically from the outer circumferential portion of the moving cam ring 48 at three equal intervals. The driving pins 50 extend through hole portions 2a in the fixed barrel 2 and are fitted in groove portions 37b formed in the inner circumferential portion of the driving ring 37. The tapered distal end portions of follower pins 51 are in slidable contact with taper cam grooves 2b formed in the inner circumferential portion of the fixed barrel 2. FIG. 9 is a development of the inner surface of the fixed barrel 2.

Figure 10:
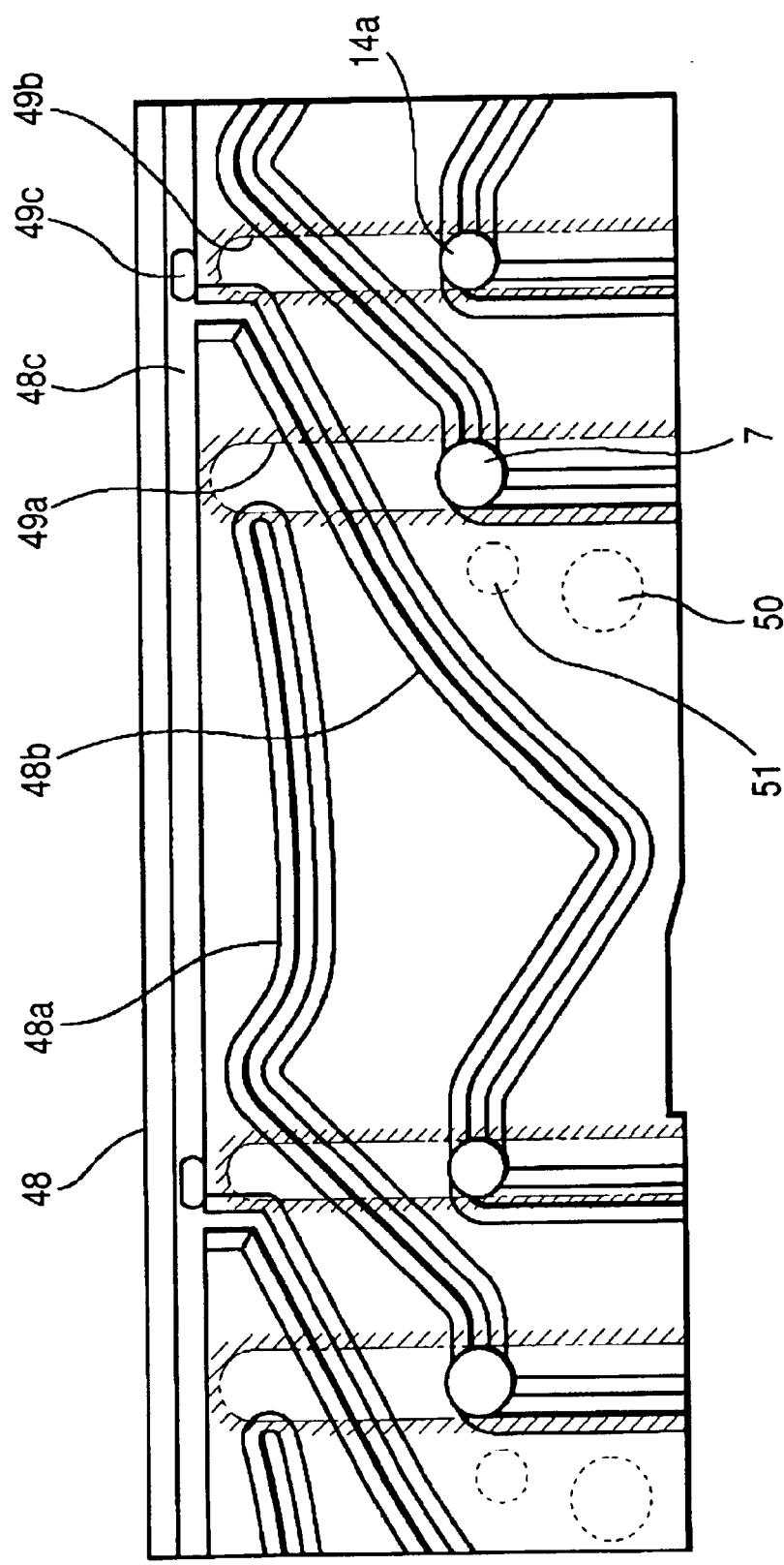
FIG. 10 is a development of the inner surface of a moving cam ring 48.

FIG. 10 is a development of the inner surface of the moving cam ring 48. Taper cam grooves 48a and 48b are formed in the inner circumferential portion of the moving cam ring 48. The followers 7 and 14a are in slidable contact with the taper cam grooves, respectively. Note that each of the arrows in FIGS. 9 and 10 indicates the rotational direction of the lens barrel when it extends.

At the same time, the side surface portions of the respective followers are fitted in linear grooves 49a and 49b of the rectilinear guide barrel 49 so that the positions of the followers in the rotational direction are restricted. In addition, a front projection portion 49c on the outer circumferential portion of the rectilinear guide barrel 49 is in contact with the groove portion 48c in the inner circumferential portion of the moving cam ring 48, and a flange portion 49d on the rear end portion is in contact with the end portion of the moving cam ring 48. This restricts the movement of the rectilinear guide barrel 49 relative to the moving cam ring 48 in the optical axis direction. At the same time, a rear projection portion 49e is fitted in a linear groove portion 2c in the inner circumferential portion of the fixed barrel 2 so as to be able to move straight, and the movement of the rear projection portion 49e in the rotational direction is restricted.

Figure 11A:
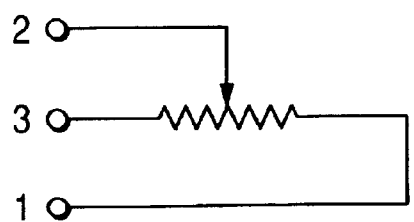
FIGS. 11A and 11B are views showing characteristics of a linear sensor.
Figure 11B:
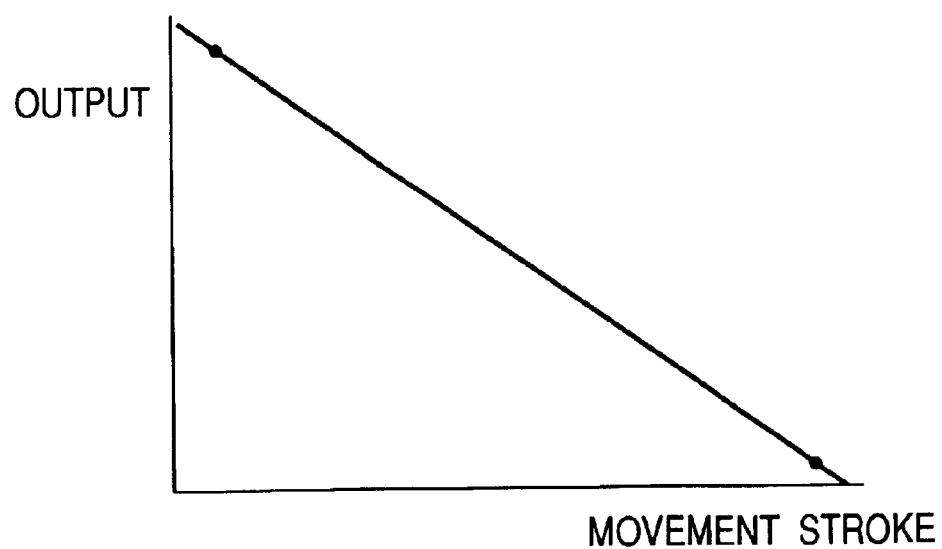
Figure 12:
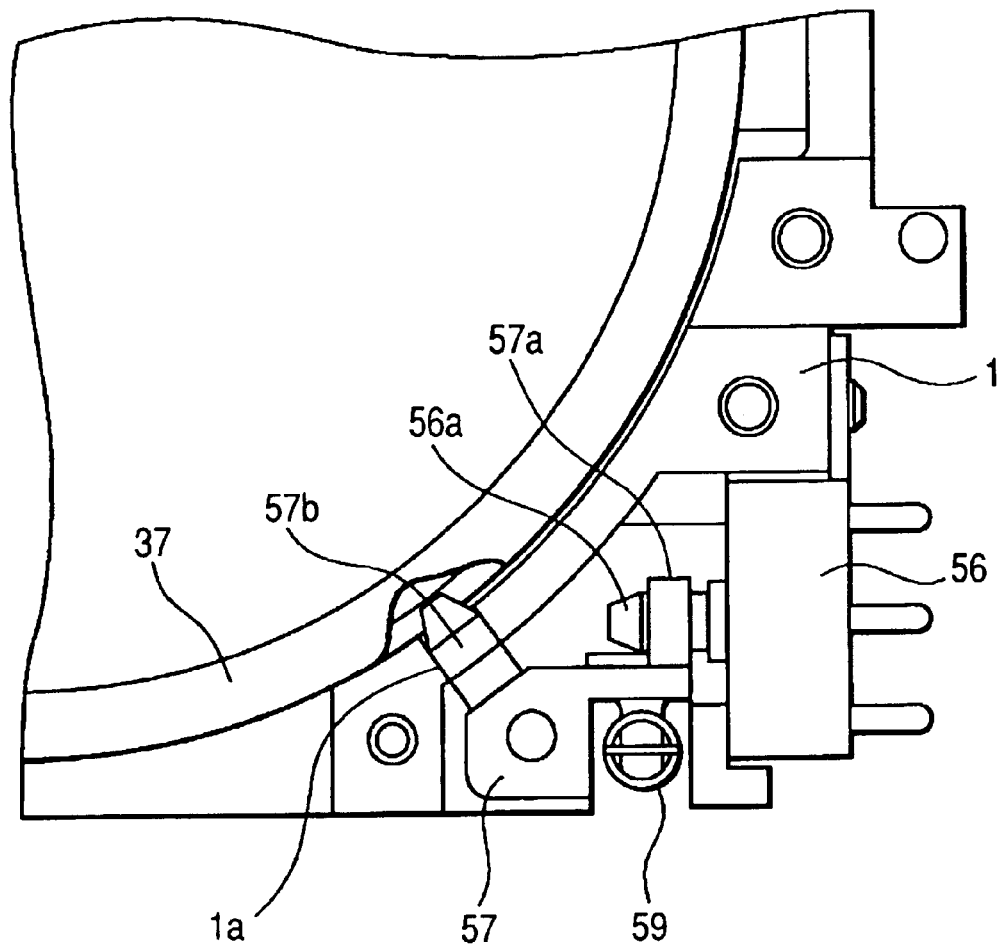
FIG. 12 is a front view of a portion around the linear sensor.

Referring to FIGS. 2 to 6, a cap 52 holds a dustproof sheet 53 between itself and the fixed barrel 2. A dustproof sheet 55 is also inserted in the groove portion 48c of the moving cam ring 48. A linear sensor 56 is fixed to the base 1 with screws or the like. As shown in FIG. 11A, the linear sensor 56 is formed from a variable resistor. As a slider 56a slides, the output changes linearly, as shown in FIG. 11B. A lever 57 clamps the slider 56a on an arm portion 57a and is guided by a guide bar 58. A follower portion 57b having a tapered distal end portion is mounted on the distal end of the lever 57. The side surface of the lever 57 is fitted in a groove portion 1a of the base 1. A spring 59 shifts the lever 57 to one side. FIG. 12 is a front view of this portion.

Figure 13:
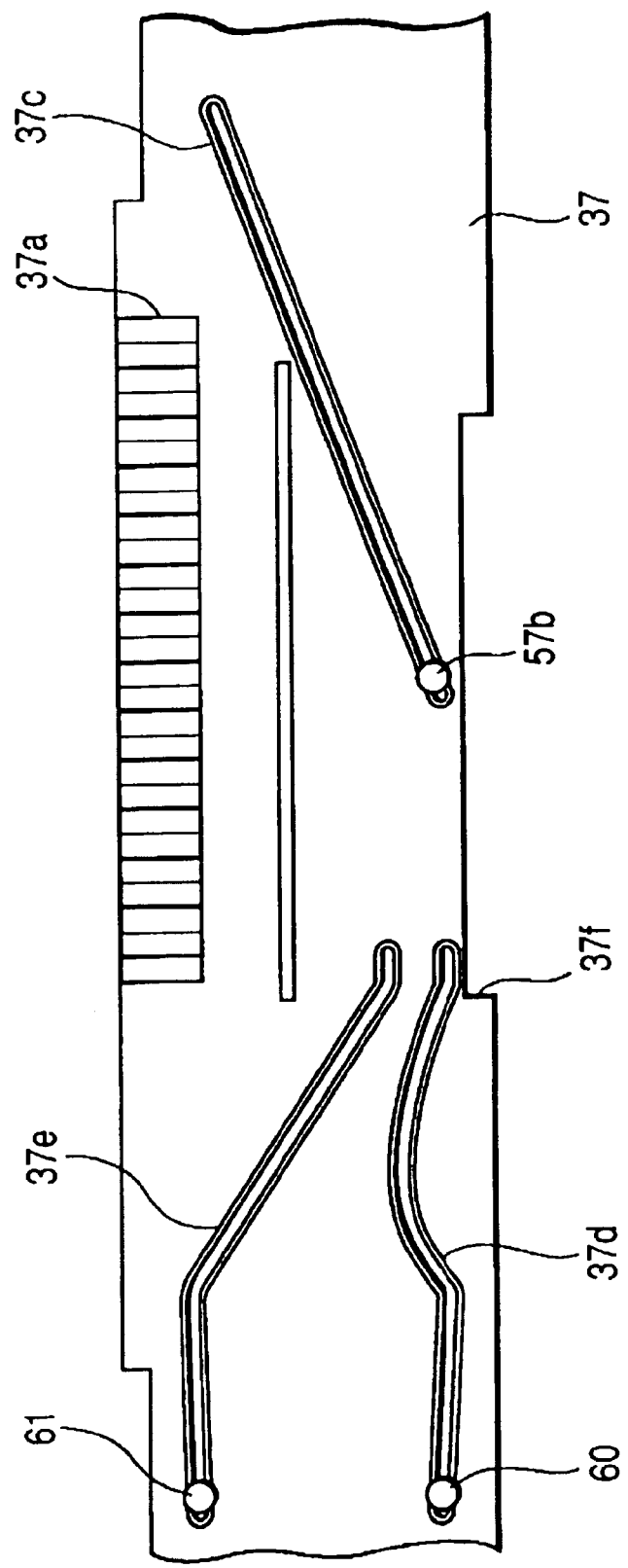
FIG. 13 is a development of the outer surface of a driving ring 37.

FIG. 13 is a development of the outer surface of the driving ring 37. The follower portion 57b of the lever 57 is in slidable contact with a linear cam groove 37c. Taper cam grooves 37d and 37e are formed to zoom a finder lens (not shown). A follower portion 60 is integrally formed on a compensator lens (not shown). A follower portion 61 is integrally formed on a variator lens (not shown). These follower portions are in slidable contact with the taper cam grooves 37d and 37e, respectively.

The operation of the above arrangement will be described next.

When the DC motor 38 is driven, the driving ring 37 rotates via the gears 39 to 45 (see FIG. 8), and the moving cam ring 48 rotates via the driving pins 50, as described above. Since the moving cam ring 48 moves along the taper cam groove 2b of the fixed barrel 2 via the follower pins 51, the moving cam ring 48 also moves in the optical axis direction (see FIG. 9). When the moving cam ring 48 moves in the optical axis direction, the rectilinear guide barrel 49 also moves in the optical axis direction. Since the rear projection portion 49e of the outer circumferential portion is restricted by the linear groove portion 2c, the rectilinear guide barrel 49 moves only in the optical axis direction without rotating.

When the moving cam ring 48 rotates, the first lens unit barrel 3 and second lens unit barrel 9 fixed to the aperture stop unit 14 relatively move in the optical axis direction along the linear grooves 49a and 49b in accordance with the lifts of the taper cam grooves 48a and 48b of the moving cam ring 48 (see FIG. 10).

Figure 14D:
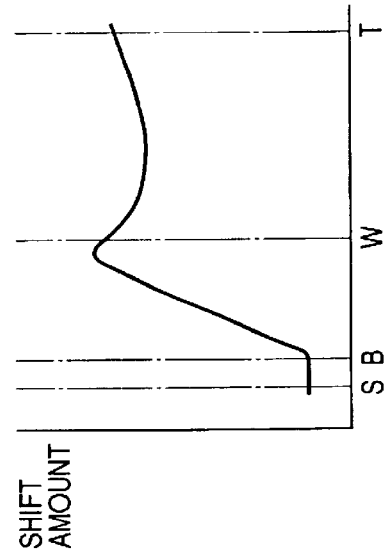
FIGS. 14A, 14B, 14C, 14D and 14E are graphs for explaining the loci of a cam and lens barrel.
Figure 14E:
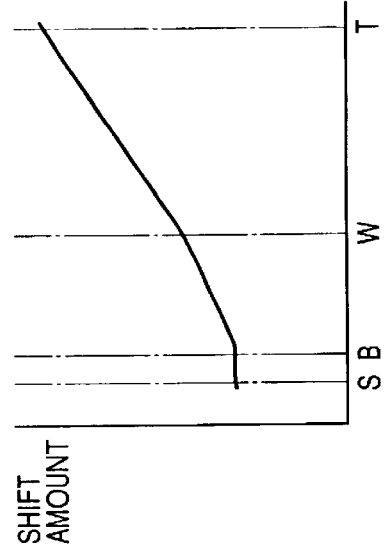
Figure 14A:
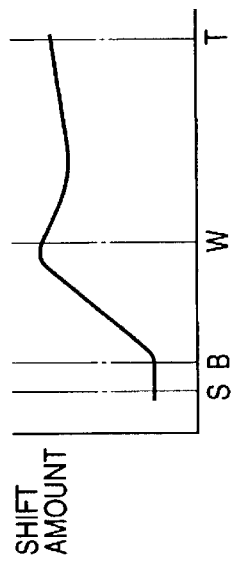
Figure 14B:
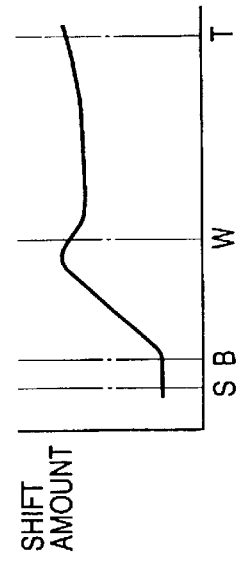
Figure 14C:
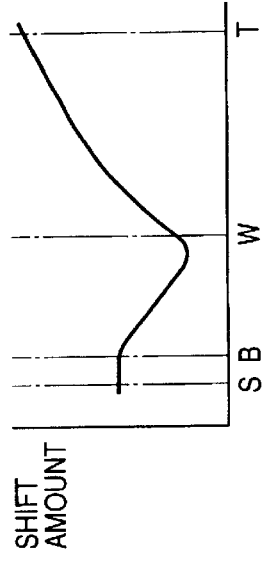

FIGS. 14A to 14E are graphs showing only the loci of the cam portions. FIG. 14A shows the locus of the cam of the fixed barrel 2. FIG. 14B shows the locus of the first lens unit barrel cam of the moving cam ring 48. FIG. 14C shows the locus of the second lens unit barrel of the moving cam ring 48. FIG. 14D shows the locus of the first lens unit barrel, which corresponds to the sum of the loci in FIGS. 14A and 14B. FIG. 14E shows the locus of the second lens unit barrel, which corresponds to the sum of the loci shown in FIGS. 14A and 14C.

Referring to FIGS. 14A to 14E, "W", "T", and "S" on the abscissa represent the wide-angle position, telephoto position, and retracted position, respectively. By driving the DC motor 38 in this manner, the retracted position and image taking position are switched, and zoom operation is performed within the image taking range. As described above, when the driving ring 37 rotates, the finder lens (not shown) moves in the optical axis direction along the taper cam grooves 37d and 37e via the follower portions 60 and 61, thereby interlocking with the zoom operation of the lens barrel.

At the same time, the lever 57 moves in the optical axis along the linear cam groove 37c, and displaces the slider 56a of the linear sensor 56, thereby changing the output from the linear sensor 56, as shown in FIG. 11B. Zoom positions can be sequentially detected by detecting the output.

Figure 15A:
FIGS. 15A, 15B and 15C are views showing the three types of zoom driving modes of the camera according to this embodiment.
Figure 15B:
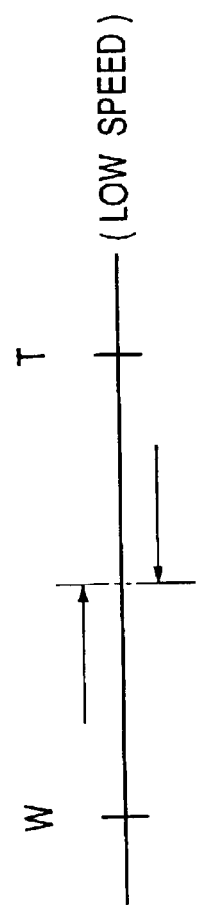
Figure 15C:
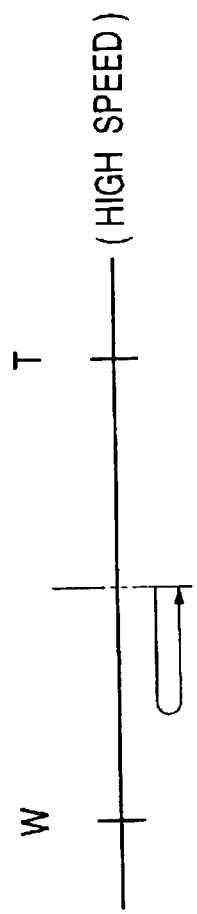

FIGS. 15A to 15C are views showing the three types of zoom driving modes of the camera according to this embodiment. Referring to FIGS. 15A to 15C, each arrow indicates the zoom driving direction; "W", the wide-angle position; and T, the telephoto position.

FIG. 15A shows the mode in which the lens unit is always driven and stopped from one direction with respect to a target position. This makes it possible to position the lens unit with high precision by absorbing the influences of backlash of the gears 39 to 45. At this time, the control part 74 controls to allow a high voltage to be applied between the terminals of the DC motor 38. Therefore, the motor is driven at high speed. With this operation, the lens unit can be positioned quickly.

FIG. 15B shows the mode in which the lens unit is stopped at the target position without reverse driving as in the mode shown in FIG. 15A. This makes it possible to eliminate an awkward change in view angle during moving image taking. The control part 74 also controls to lower the terminal voltage to drive the motor at a low speed. With this operation, the driving sound during moving image taking can be reduced.

FIG. 15C shows the mode in which the lens unit is shifted to one side again at the current stop position. In this mode, the lens unit is positioned at the same driving speed as in the mode shown in FIG. 15A.

Figure 16:
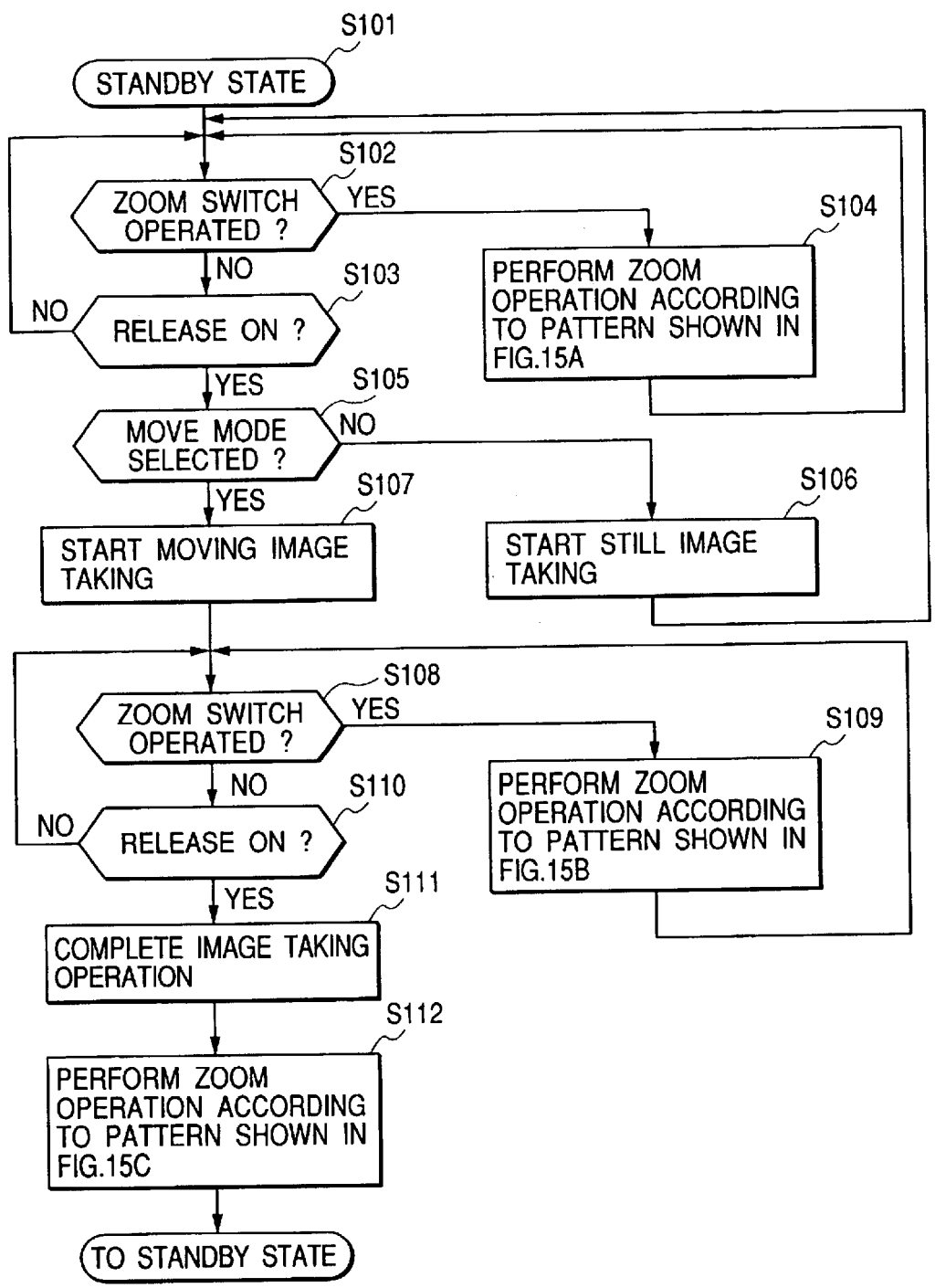
FIG. 16 is a flow chart showing the operation of the camera according to this embodiment.

FIG. 16 is a flow chart showing the operation of the camera according to this embodiment.

When an image taking mode is selected by the mode dial 76, the lens is caused to extend and positioned at the wide-angle position, and a standby state is set (step S101). This driving operation is performed in accordance with the driving pattern shown in FIG. 15A. In this state, it is checked as needed whether the zoom switch 77 and release switch are operated (steps S102 and S103).

When the zoom switch 77 is operated, the lens is driven in the telephoto direction or wide-angle direction in accordance with the corresponding instruction and the driving pattern shown in FIG. 15A (step S104). After the lens is stopped, the flow returns to the standby state in step S101. When the release SW 79 is operated, the state of the selection SW 78 is checked (step S105). If the still image mode is selected, still image taking is performed (step S106). At this time, single-shot shooting of taking only one image or continuous shooting of continuously taking images while the release SW 79 is pressed may be performed. However, zoom operation is not accepted at the same time. After the image taking, the flow returns to the standby state in step S101.

If the moving image mode is selected by the selection switch, moving image taking is started (step S107), and image taking is continued until the release SW 79 is operated next. If the zoom switch 77 is operated in this period (YES in FIG. 108), the lens is driven in the telephoto direction or wide-angle direction in accordance with the corresponding instruction and the driving pattern shown in FIG. 15B (step S109), and image taking is continued. When the release SW 79 is operated again (YES in step S110), the image taking operation is terminated (step S111). The lens is positioned at the same position again in accordance with the driving pattern in FIG. 15 (step S112), and the flow returns to the initial standby state (step S101).

Note that the above control method can be realized by storing a program based on the flow chart of FIG. 16 described above, for example, in the memory 75 and executing the program.

The present invention is not limited to the apparatus according to the embodiment described above and may be applied to a system constituted by a plurality of devices or an apparatus comprising a single device. Obviously, the object of the present invention is realized even by supplying a storage medium storing software program codes for realizing the functions of the above-described embodiment to a system or apparatus, and causing the computer (or a CPU or an MPU) of the system or apparatus to read out and execute the program codes stored in the storage medium.

In this case, the program codes read out from the storage medium realize the functions of the above-described embodiment by themselves, and the storage medium storing the program codes constitutes the present invention. As a storage medium for supplying the program codes, a floppy (registered trademark) disk, a hard disk, an optical disk, a magnetooptical disk, a CD-ROM, a CD-R, a magnetic tape, a nonvolatile memory card, a ROM, or the like can be used. The functions of the above-described embodiment are realized not only when the readout program codes are executed by the computer but also when the OS running on the computer performs part or all of actual processing on the basis of the instructions of the program codes.

In addition, the functions of the above-described embodiment are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described in detail above, according to the above embodiment, an image taking apparatus which can eliminate awkward variations in view angle, a control method therefor, and a control program therefor can be provided.

The individual components shown in schematic or block form in the drawings are all well-known in the camera arts and their specific construction and operation are not critical to the operation or best mode for carrying out the invention.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image taking apparatus comprising:
   a mode selecting unit which selects a first mode and a second mode; and
   a magnifying unit which varies a magnification ratio of an object image, said magnifying unit performing drive control to allow a zoom lens to stop at a stop position from both a telephoto side and a wide-angle side when the first mode is selected by said mode selecting unit, and performing drive control to allow the zoom lens to stop at the stop position from only one of the telephoto side and the wide-angle side when the second mode is selected.

2. An apparatus according to claim 1, wherein the first mode is a moving image taking mode, and the second mode is a still image taking mode.

3. An apparatus according to claim 1, wherein the first mode is a mode in which said magnifying unit accepts an operation instruction during image taking, and the second mode is a mode in which said magnifying unit accepts no operation instruction during image taking.

4. An apparatus according to claim 1, wherein when the first mode is selected by said mode selecting unit, said magnifying unit reciprocates the zoom lens in response to the end of image taking so as to stop from the same direction as when the second mode is selected.

5. A method of controlling an image taking apparatus, comprising:
   performing drive control to allow a zoom lens for varying a magnification ratio of an object image to stop at a stop position from both a telephoto side and a wide-angle side when a first mode and a second mode can be selected, and the first mode is selected; and performing drive control to allow the zoom lens to stop at the stop position from only one of the telephoto side and the wide-angle side when the second mode is selected.

6. A method according to claim 5, wherein the first mode is a moving image taking mode, and the second mode is a still image taking mode.

7. A method according to claim 5, wherein the first mode is a mode in which an operation instruction is accepted during image taking, and the second mode is a mode in which no operation instruction is accepted during image taking.

8. A method according to claim 5, wherein when the first mode is selected, the zoom lens is reciprocated in response to the end of image taking so as to stop from the same direction as when the second mode is selected.

9. A control program for an image taking apparatus, comprising:
   performing drive control to allow a zoom lens for varying a magnification ratio of an object image to stop at a stop position from both a telephoto side and a wide-angle side when a first mode and a second mode can be selected, and the first mode is selected; and performing drive control to allow the zoom lens to stop at the stop position from only one of the telephoto side and the wide-angle side when the second mode is selected.

10. A program according to claim 9, wherein the first mode is a moving image taking mode, and the second mode is a still image taking mode.

11. A program according to claim 9, wherein the first mode is a mode in which an operation instruction is accepted during image taking, and the second mode is a mode in which no operation instruction is accepted during image taking.

12. A program according to claim 9, wherein when the first mode is selected, the zoom lens is reciprocated in response to the end of image taking so as to stop from the same direction as when the second mode is selected.

13. A recording medium which stores the control program defined in claim 9.

* * * * *

UNITED STATES PATENT AND TRADEMARK OFFICE
CERTIFICATE OF CORRECTION

PATENT NO. : 6,754,010 B2
DATED : June 22, 2004
INVENTOR(S) : Shigeru Takeshita

It is certified that error appears in the above-identified patent and that said Letters Patent is hereby corrected as shown below:

Drawings,
Replace sheet 1 of 16 with the following attached drawing sheet 1 of 16.
Sheet 1, Figure, 1, "LINER" should read -- LINEAR --.

Signed and Sealed this

Thirtieth Day of November, 2004

JON W. DUDAS
*Director of the United States Patent and Trademark Office*